United States Patent
Ehrig

[11] Patent Number: 5,678,406
[45] Date of Patent: Oct. 21, 1997

[54] ENERGY GENERATING SYSTEM

[75] Inventor: Dietrich Ehrig, Grasberg, Germany

[73] Assignee: Daimler-Benz Aerospace AG, Munich, Germany

[21] Appl. No.: 635,940

[22] PCT Filed: Oct. 25, 1994

[86] PCT No.: PCT/DE94/01250

§ 371 Date: Apr. 26, 1996

§ 102(e) Date: Apr. 26, 1996

[87] PCT Pub. No.: WO95/12064

PCT Pub. Date: May 4, 1995

[30] Foreign Application Priority Data

Oct. 29, 1993 [DE] Germany ............... 43 36 982.0

[51] Int. Cl.$^6$ ............................................. F02G 1/04
[52] U.S. Cl. ........................ 60/525; 74/603; 74/604
[58] Field of Search ..................... 60/517, 518, 525; 74/603, 604

[56] References Cited

U.S. PATENT DOCUMENTS

| | | |
|---|---|---|
| 3,277,743 | 10/1966 | Kell . |
| 4,395,880 | 8/1983 | Berchowitz ............... 60/518 |
| 4,642,988 | 2/1987 | Benson . |
| 4,677,825 | 7/1987 | Fellows . |
| 4,691,515 | 9/1987 | Ehrig et al. ............... 60/525 |
| 4,712,378 | 12/1987 | Nakayama ............... 60/525 |
| 5,404,723 | 4/1995 | Parker et al. . |

FOREIGN PATENT DOCUMENTS

| | | |
|---|---|---|
| 875110 | 8/1952 | Germany . |
| 3723950 | 8/1988 | Germany . |
| 3834071 | 4/1990 | Germany . |

*Primary Examiner*—Alfred Basichas
*Attorney, Agent, or Firm*—W. G. Fasse; W. F. Fasse

[57] ABSTRACT

In an energy generating system, which is preferably suitable for satellites and space stations, a total of four Stirling engines are combined together into a cross-shaped unit, in the center of which is arranged a cross-gear drive that is acted upon by the pistons of the Stirling engines. Therein, two planet gears revolve around in internally toothed annular gears. The common shaft of the annular gears is connected with the piston rods of the Stirling engines by an inner crankshaft, which simultaneously carries the planet gears, and by an outer crankshaft articulately connected with the inner crankshaft. Both crankshafts comprise counterweights as balancing masses, whereby a complete mass balancing of the cross-gear drive and therewith a vibration-free operation of the entire arrangement is achieved.

18 Claims, 4 Drawing Sheets

ENERGY GENERATING SYSTEM

CROSS-REFERENCE TO RELATED APPLICATION

This application is related to my copending application U.S. Ser. No. 08/635,939, PCT/DE94/01252, Attorney Docket No. 3253, entitled "Energy Generating System", filed simultaneously herewith.

FIELD OF THE INVENTION

The invention relates to an energy generating system, especially for satellites and space stations, based on Stirling engines.

BACKGROUND INFORMATION

Engines operating according to the Stirling-cycle process have long been known. Just as for Diesel and Otto engines, the operating principle thereof is based on a working gas being compressed at a low temperature and then being expanded at a high temperature. In contrast to the two latter mentioned engines however, the working gas in a Stirling engine is not heated by an internal combustion, but rather the heat is continuously provided to the working gas from outside. For that reason, temperature differences in nearly any desired range can be converted into mechanical work with the Stirling engine.

The Stirling engine originally was embodied as a single cylinder engine with two loaded pistons, and later was predominantly used in the so-called V-arrangement in which a displacer was arranged in one cylinder and a piston was arranged in a second cylinder. Thereafter, in more recent times, so-called double-acting Stirling engines have come into use, in which, for example four cylinders operate with a suitable phase shift one after another. Each of the cylinders in the latter mentioned arrangement has only one piston, which simultaneously serves as a displacer for the following piston. Components common to all Stirling engines are the heater, the regenerator, and the cooler, which are arranged between the displacer and the piston in the V-arrangement, and which are arranged respectively between the individual cylinders in the double-acting Stirling engine.

Stirling engines are generally driven by a constantly burning flame, for which the most varied fuels are used. It has also already been sporadically suggested to drive Stirling engines with solar energy, and use these for sea water desalination, for example. In addition to the already mentioned advantage of being able to use any desired temperature interval for the generation of mechanical work, Stirling engines are distinguished by a high efficiency, an advantageous torque characteristic over the range of operating rotational speeds, as well as a vibration-free operation.

Despite these clearly evident advantages, the field of use of Stirling engines is still very limited. Thus, in satellites and space stations, photovoltaic energy generating systems are predominantly used at the present time, even though the energy yield that can be obtained therewith is comparatively small. Especially in future space stations, the energy demand will be so high, that it will be scarcely possible to cover the demand through photovoltaic means.

SUMMARY OF THE INVENTION

It is the object of the invention to provide an energy generating system based on the Stirling hot air engine, that is suitable both for terrestrial applications, and also for use in orbital stations. Further objects of the invention are to overcome the disadvantages discussed above and achieve the advantages discussed below.

The invention achieves these object by means of an energy generating system using a Stirling engine, wherein the pistons of the Stirling engine are connected with a gear drive in which at least one externally toothed planet gear is guided by a respective first inner crank to revolve around in at least one internally toothed annular gear, wherein the inner crank is articulately connected through a second outer crank with the piston rod of the piston, and in that both the inner crank and also the outer crank are respectively provided with counter-weights. Advantageous further details of the energy generating system include the following. Preferably, four Stirling engines are arranged in a cross-shape and the pistons of the Stirling engines are connected with a centrally arranged cross-gear drive. Two of the annular gears, with two respective planet gears revolving therein, can be combined together by a common inner crankshaft, and an outer crankshaft articulately connected therewith is acted upon by the piston rods of the pistons. Particularly, the outer crankshaft is embodied as a two-throw crank in order to form two outer cranks offset from each other by 180°, and the piston rods of two respectively mutually oppositely located pistons engage each of the two outer cranks. The diameter of the planet gear amounts to half of the diameter of the annular gear, and the length of the inner crank is equal to that of the outer crank.

Thus, the combination of Stirling engines and a gear drive arrangement with mass balancing provided in the energy-generating system according to the invention achieves an extremely easy construction of the apparatus. Since no first and second order mass forces become effective in this drive arrangement, the energy generating system according to the invention comprises a minimum of vibrations.

A further advantage of the energy generating system according to the invention exists in that the short-stroke cylinders do not necessarily have to be arranged in a standing orientation, but rather can also be arranged in a lying orientation. The structural height of such an energy generating system, regardless whether it is driven with solar energy or by combustion heat, is thus approximately only half as large as the conventional energy generating plants based on Stirling engines, having a comparable output power. Simultaneously, a weight reduction of about 50% is achieved relative to these conventional systems, in which generally extremely heavy drive arrangements such as swash plate drives with slide blocks, double crankshaft systems, or V-shaped arrangements are used.

Moreover, since the entire system can be constructed in a completely encapsulated manner, the working gas pressures of typically more than 10 MPa (with the working gas preferably being helium or hydrogen) do not need to be sealed relative to the surrounding environment. Thus, a pressure prevails in the drive that is between the pressure during the compression stroke and the pressure during the working stroke. Since only the differences arising between this intermediate pressure and the compression pressure or the working pressure need to be sealed, the wear arising on the piston rings, or rather the wear caused by the piston rings on the contact surfaces is extremely small. Therefore, the energy generating system according to the invention is practically maintenance free and is distinguished by a long operating lifetime, which makes it especially suitable for use in space flight missions.

BRIEF DESCRIPTION THE DRAWINGS

An example embodiment of the invention is schematically shown in the drawing, wherein:

3

Figure 5:
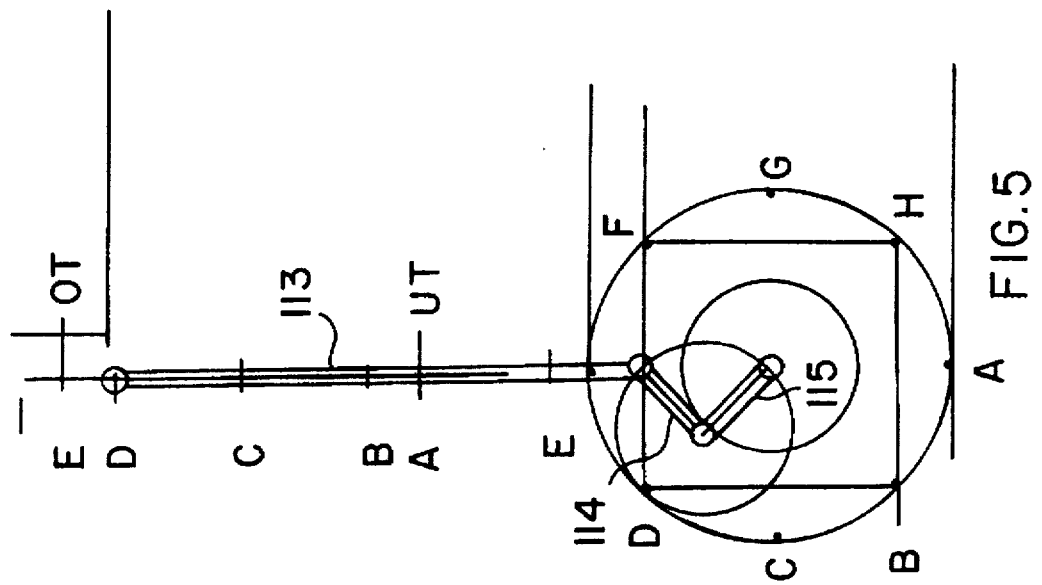
Figure 4:
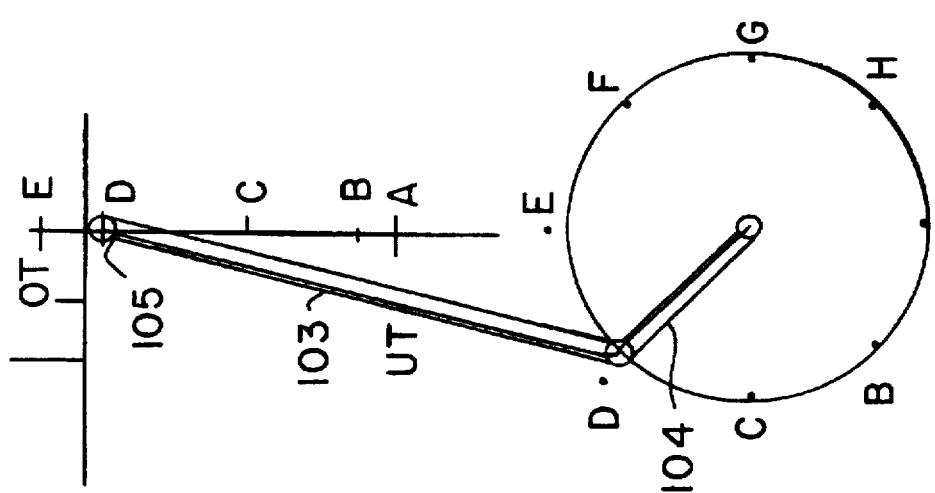

FIG. 4 schematically shows the operation of a conventional thrust crank drive; and FIG. 5 schematically shows the operation of a gear drive according to the invention, for comparison with the crank drive of FIG. 4.

DETAILED DESCRIPTION OF PREFERRED EXAMPLE EMBODIMENTS AND OF THE BEST MODE OF THE INVENTION

Figure 1:
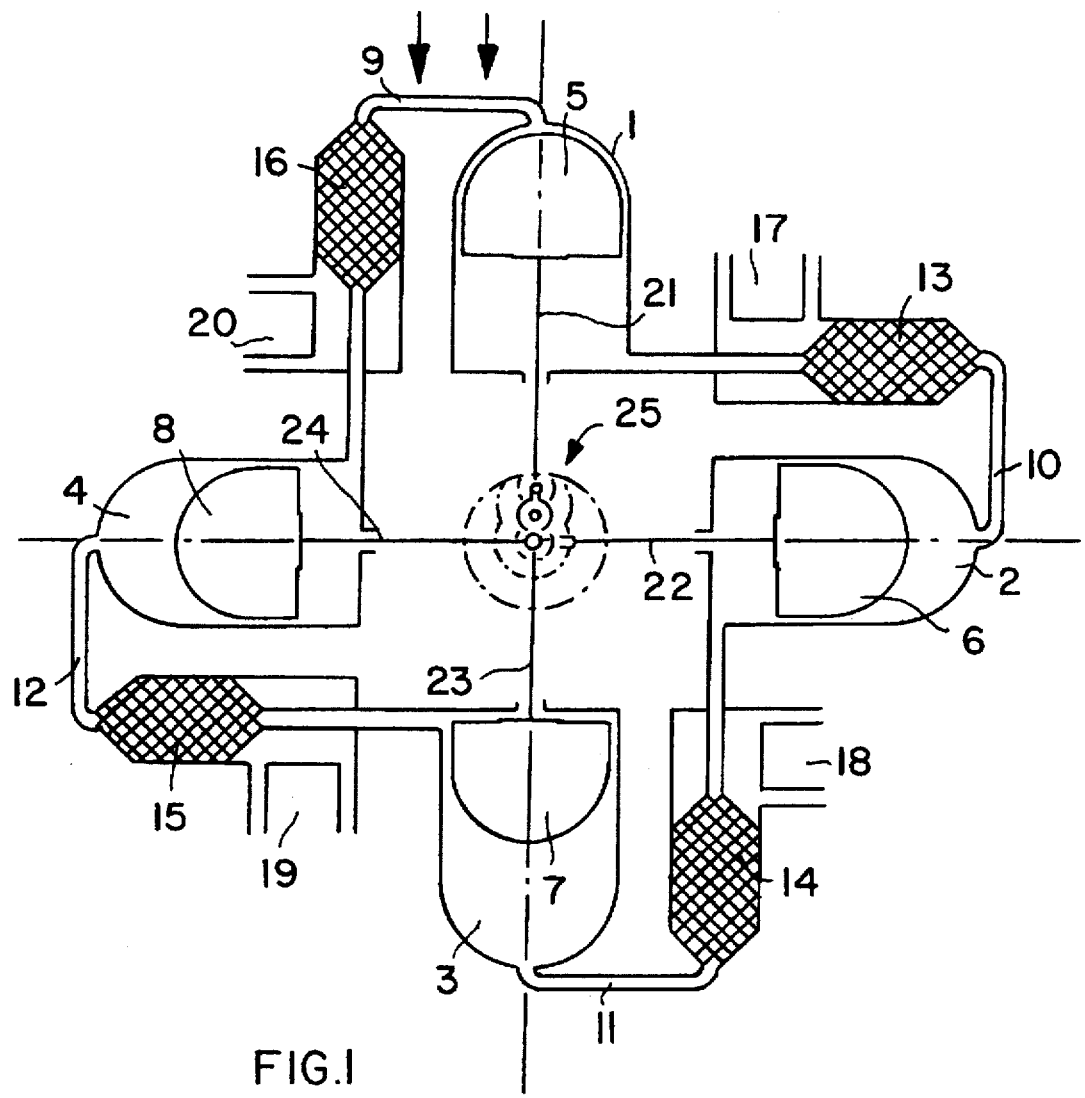
FIG. 1 shows a horizontal section through a Stirling engine with four cylinders.

The arrangement according to FIG. 1 relates to the schematic view of a double-acting Stirling engine with four cylinders 1 to 4, which work with a phase shift of respectively 90° one after another. In each of the cylinders 1 to 4, a piston 5 to 8 is arranged, which simultaneously functions as a displacer for the following cylinder. Between every two respective successive cylinders, a heater 9 to 12, a regenerator 13 to 16, and a cooler 17 to 20 are respectively arranged. Finally, each of the pistons 5 to 8 is connected by a piston rod 21 to 24 to a cross-gear drive 25.

The energy required for performing mechanical work is provided to the working gas, which is hydrogen or helium in the case of the presently described example embodiment, by means of radiant heat in the area of the heaters 9 to 12, as is shown by arrows for the heater 9 in FIG. 1. In this context, the respective side of the cylinder 1 to 4 directed toward the heater 9 to 12 is the hot side, while the side directed toward the cooler 17 to 20 is the cold side. The working gas is respectively pushed cyclically back and forth between two successive pistons.

The regenerators 13 to 16 arranged respectively between each of the coolers 17 to 20 and the associated heater 9 to 12 serve as short-term heat reservoirs or absorbers. On the one hand, these heat reservoirs remove heat from the working gas flowing out of the hot region of the cylinders, so that this removed heat is not completely lost as rejected heat in the cooler. On the other hand, these heat reservoirs give off the stored heat to the working gas flowing into the hot region, and thereby already heat-up the working gas before it reaches the heater. In the example embodiments described here, the regenerators 13 to 16 are thermodynamically optimized by minimizing the flow losses and dead volumes as well as by maximizing their heat storage capacity, so that they make it possible to achieve high efficiencies of the respective energy generating systems. The removal of the lost heat from the coolers 17 to 20 is achieved i.e. so-called heat pipes, which are not shown in the figures.

As a result of the cross-shaped arrangement of the four cylinders 1 to 4 with the cross-gear drive 25, there arises a substantially uniform progress characteristic of the torque moment for each 360° rotation. Therefore, in this arrangement, the use of an energy robbing flywheel can be avoided. In this context, the exact construction of the cross-gear drive 25 can be seen from FIG. 2.

Figure 2:
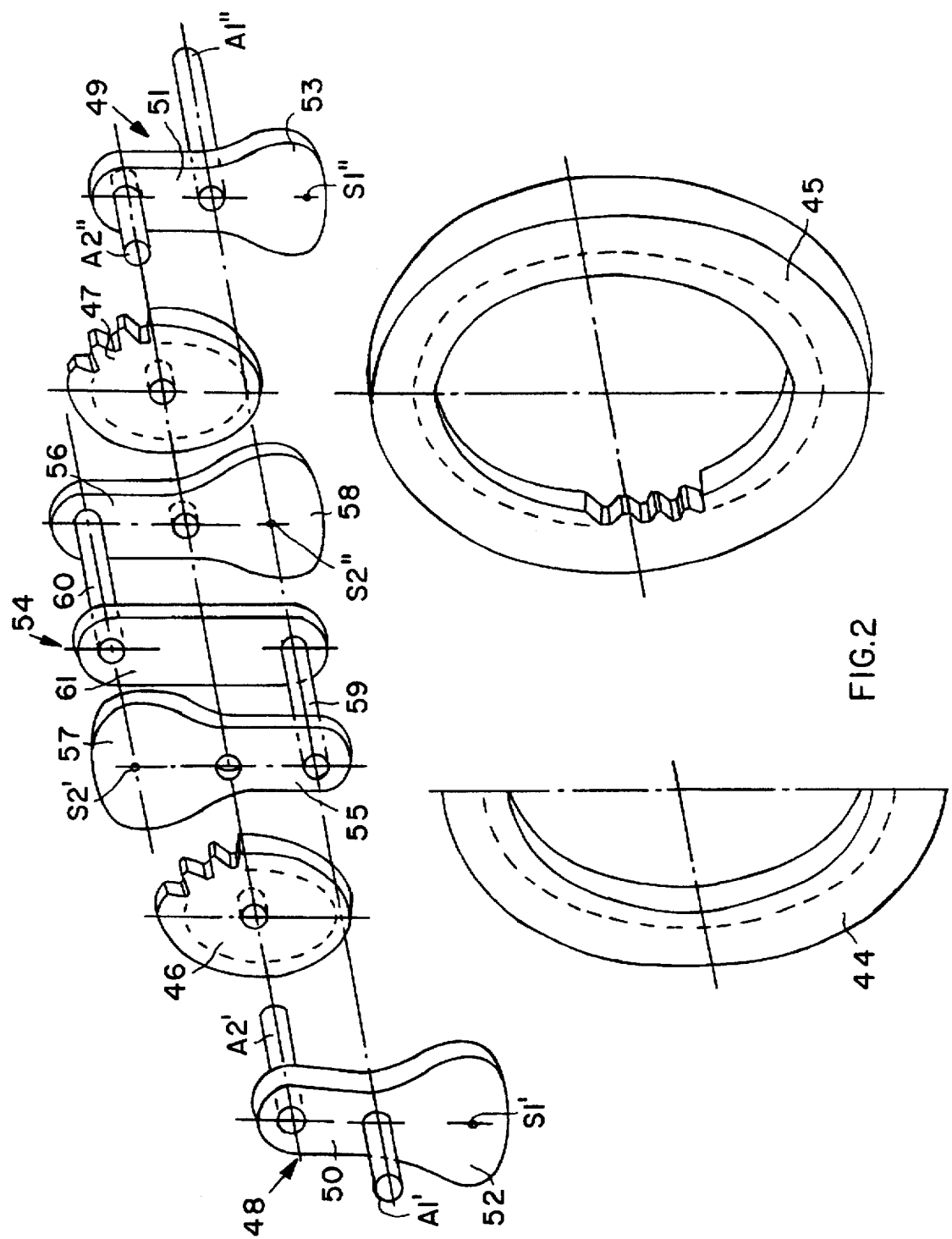
FIG. 2 shows an exploded view of the cross-gear drive of FIG. 1.

The exploded view according to FIG. 2 shows that the cross-gear drive 25 comprises two internally toothed annular gears 44 and 45, in which two planet gears 46 and 47 revolve. The rotation axes of the two planet gears 46 and 47 are respectively supported on the two partial members 48 and 49 of a two-piece-constructed inner crankshaft. Counterweights 52 or 53 are respectively formed on the crank webs 50 or 51 of these two partial members 48 and 49. The centers of mass S1' or S1" of these counterweights 52 and 53 have the same spacing distance from the rotation axes A1' and A1" of the two partial members 48 and 49 as do the journal connecting points A2' and A2", which simultaneously form the rotation axes for the planet gears 46 and 47.

The outer crankshaft 54 is embodied as a two-throw crank, wherein once again the crank webs 55 and 56 facing in opposite directions are provided with counterweights 57 and 58. Also in these counterweights, the centers of mass S2' and S2" are spaced away from the rotational axis of the outer crankshaft 54, which is defined by the connection of the two journal connecting points A2' and A2", by the same spacing distance as are two shaft sections 59 and 60 that form the journal connecting points for the piston rods 21 to 24, and that are connected together by the rod 61.

Figure 3:
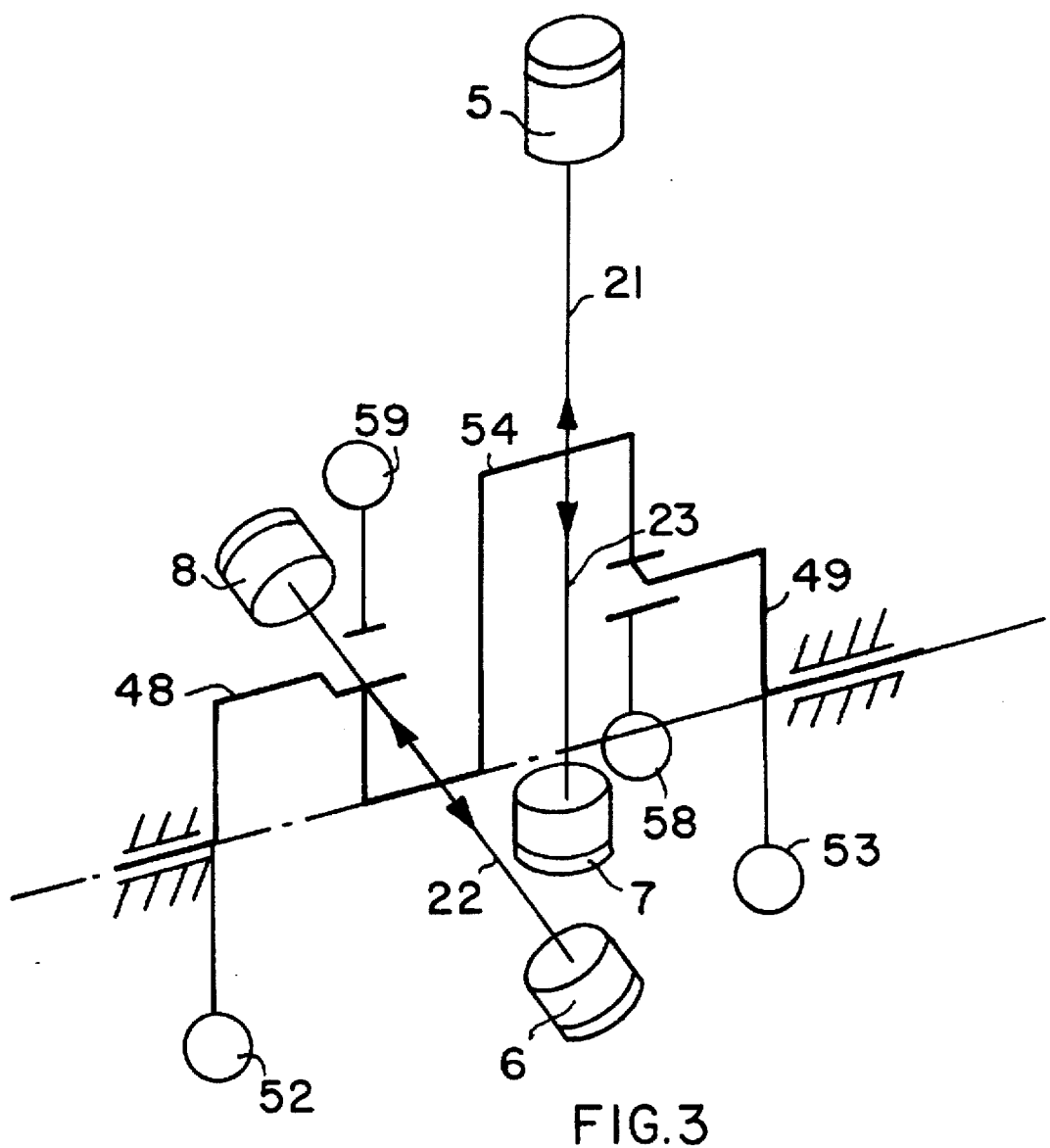
FIG. 3 shows a principle schematic diagram of the cooperation of the components of the arrangement shown in FIGS. 1 and 2.

In FIG. 3 the entire arrangement is illustrated in a three-dimensional schematic sketch. Therein, the arrows represent the stroke motion of the pistons 5 to 8, which are converted into a rotational motion, which can be taken-off from the output ends of the two partial members 48 and 49 of the inner crankshaft in order to generate power.

While the centers of mass S1', S1" of the counterweights 52 and 53 revolve along the same circular path as the rotation axes of the planet gears 46 and 47, the centers of mass S2', S2" of the counterweights 57 and 58 respectively carry out a linear up-and-down motion. All of the counterweights 52, 53, 57 and 58 together achieve, as a result of their different patterns of motion, that absolutely no mass forces of first order become effective in the cross-gear drive shown in FIG. 2. Moreover, mass forces of second order cannot arise due to the construction in such gear drives. Thus a complete mass balancing compensation is achieved, which ensures an absolutely vibration-free operation of the entire energy generating system.

It should be mentioned that this complete mass balancing compensation is achieved separately for each one of the two pairs of oppositely located cylinders 1 and 3, or 2 and 4, and therewith the mass balancing compensation is brought about directly at the location at which the mass forces to be compensated arise, namely in the gear drive itself. This results in the possibility of an extremely compact construction with a very small gear drive housing, which can be acted upon by the operating pressure of the working gases. Therefore, complicated seals on the four piston rods, as they otherwise are typical in double-acting Stirling engines, can either be completely omitted or at least substantially simplified. The seal for the force output drive shaft can thereby either be achieved with slide ring seals, or an encapsulated magnetic coupling can be provided for the force transmission.

In comparison to the thrust crank drives otherwise typically used for such energy generating systems, the cross-gear drive furthermore possesses the advantage of an almost "infinitely" long piston rod. This means that in such a gear drive, the piston stroke distance has the same magnitude near top dead center as well as near bottom dead center for equivalent travelled distances of the inner crankshaft. In contrast, the piston stroke distance in a typical thrust crank drive is twice as large near the top dead center as it is in the area of the bottom dead center. This is finally illustrated by FIGS. 4 and 5.

In the thrust crank drive shown in FIG. 4, the oscillating motion of the piston of a drive cylinder is transmitted through a coupling or connecting rod 103 to a crank 104 that revolves around a circular path, and in this manner the oscillating motion is converted into a rotational motion. In this context, the journal connection of the connecting rod 103 to the piston is achieved by a cross or knuckle joint 105 since the connecting rod 103 carries out a two-dimensional motion in the plane of the drawing.

In contrast thereto, in the gear drive shown in FIG. 5, the piston rod 113 carries out the same linear motion as the associated piston. The piston rod 113 is articulately connected through an outer crank 114 to an inner crank 115, which, like the crank 104 of the thrust crank drive, revolves around on a circular path, and from the rotational shaft of which the drive power of the cylinder can be taken-off as rotational energy. The inner crank 115 simultaneously forms the web for a planet gear, which is not shown here, and which revolves with its external gear teeth around an internally toothed annular gear, as can be seen in FIG. 2. The diameter of the planet gear is half as large as that of the annular gear. The length of the outer crank 114 corresponds exactly to the length of the inner crank 115.

The rotational motion of the cranks 104 and 115 is respectively divided into eight positions in FIGS. 4 and 5. Among the eight positions, for the positions A to E, the associated positions of the moving piston are respectively also shown in the figure as represented by the end point of the piston rods 103 or 113. In the thrust crank drive shown in FIG. 4, the piston travels through paths of different lengths between the positions A and B or D and E; for example with a crank length of 40 mm the piston travels a path of 4 mm between A and B, and 8 mm between D and E.

In contrast thereto, in the gear drive shown in FIG. 5, the piston stroke distance for both paths A, B or D, E is respectively about 6 mm, when the two cranks 114 and 115 together similarly have a length of 40 mm. For a double-acting Stirling engine with four cylinders operating respectively shifted by 90°, this has decisive effects on the final compression pressure that can be achieved and therewith on the efficiency of the entire energy generating system. This is explained as follows. At the greatest compression, the piston of the "cold" cylinder is located in position D, in other words approximately 45° before top dead center OT, and the piston of the "hot" working cylinder is in position F, approximately 45° after top dead center. Exactly in this position of the two cylinders, there results in the gear drive according to FIG. 5 (with the stated dimensions) a minimum dead volume with a stroke of 2×6 mm, in other words 12 mm. In contrast, in a conventional thrust crank drive, this minimum dead volume corresponds to a stroke of 2×8 mm, in other words 16 mm. Thus, the achievable final compression pressure and therewith the efficiency is substantially higher when using the cross-gear drive than when using a conventional thrust crank drive.

DETAILED DESCRIPTION OF PREFERRED EXAMPLE EMBODIMENTS AND OF THE BEST MODE OF THE INVENTION

Although the invention has been described with reference to specific example embodiments, it will be appreciated that it is intended to cover all modifications and equivalents within the scope of the appended claims.

I claim:

1. An energy generating system comprising a Stirling engine and a gear drive connected thereto, wherein said Stirling engine comprises a piston and a piston rod connected thereto, and said gear drive comprises an internally toothed annular gear, an externally toothed planet gear engaging and adapted to revolve along said annular gear, an inner crank carrying said planet gear, and an outer crank that is interposed between and that journal-connects said inner crank and said piston rod, and wherein said inner crank and said outer crank each respectively include a counterweight.

2. The energy generating system of claim 1, wherein said Stirling engine comprises a plurality of said pistons and said piston rods, and said gear drive comprises a plurality of said annular gears and a corresponding plurality of said planet gears respectively engaging said annular gears.

3. The energy generating system of claim 1, wherein said Stirling engine comprises four of said pistons with four of said piston rods arranged respectively in four cylinders in a cross-shape.

4. The energy generating system of claim 3, wherein said gear drive is a cross-gear drive and is arranged centrally in said cross-shape, and wherein said four pistons are all connected to said cross-gear drive.

5. The energy generating system of claim 4, wherein said gear drive comprises two of said annular gears and two of said planet gears respectively engaging and revolving along said two annular gears, an inner crankshaft that includes said inner crank and that is common to and carries said two planet gears, and an outer crankshaft that includes said outer crank and that is journal-connected to said inner crankshaft and that is acted upon by said piston rods.

6. The energy generating system of claim 5, wherein said inner crankshaft is divided into and comprises two partial crankshaft members.

7. The energy generating system of claim 6, wherein said outer crankshaft is a two-throw crankshaft including two of said outer cranks offset 180° from one another, and each one of said outer cranks is respectively journal-connected to two of said piston rods of a pair of oppositely arranged ones of said pistons.

8. The energy generating system of claim 5, wherein said outer crankshaft is a two-throw crankshaft including two of said outer cranks offset 180° from one another, and each one of said outer cranks is respectively journal-connected to two of said piston rods of a pair of oppositely arranged ones of said pistons.

9. The energy generating system of claim 7, wherein said planet gears each have a planet gear diameter, said annular gears each have an annular gear diameter, and said planet gear diameter is half of said annular gear diameter.

10. The energy generating system of claim 1, wherein said planet gear has a planet gear diameter, said annular gear has an annular gear diameter, and said planet gear diameter is half of said annular gear diameter.

11. The energy generating system of claim 9, wherein said inner crank and said outer cranks each have an equal crank length.

12. The energy generating system of claim 1, wherein said inner crank and said outer crank each have an equal crank length.

13. The energy generating system of claim 1, wherein said piston rod is arranged and connected to said gear drive to be substantially linearly axially slidable.

14. The energy generating system of claim 1, wherein said gear drive is configured and arranged in such a manner that equal incremental amounts of stroke travel of said piston from a top dead-center position and from a bottom dead-center position are converted into equal incremental amounts of rotational travel of said inner crank.

15. The energy generating system of claim 1, wherein said piston rod is rigidly connected to said piston.

16. An energy generating system comprising a Stirling engine and a gear drive connected thereto, wherein said Stirling engine comprises a plurality of pistons arranged in a plurality of cylinders with axes thereof extending radially in a spoke pattern, and a plurality of piston rods respectively connected to said pistons, and wherein said gear drive comprises an internally toothed annular gear, a first crankshaft including a power output shaft, a first crank mounted on said output shaft, a first crank pin connected to said first crank at an offset from said output shaft, and a first counterweight provided on said first crank offset from said output shaft opposite said first crank pin, an externally toothed planet gear rotatably mounted on said first crank pin in constant engagement with said internally toothed annular gear, and a second crank arrangement including a second crank rotatably mounted on said first crank pin and connected to said planet gear, a second crank pin connected to said second crank at an offset from said first crank pin, and a second counterweight provided on said second crank offset from said first crank pin opposite said second crank pin, wherein at least one of said piston rods is journal-connected to said second crank pin.

17. The energy generating system of claim 16, wherein said first crankshaft comprises two of said first cranks and two of said first crank pins, and said gear drive comprises two of said annular gears and two of said planet gears rotatably mounted respectively on said two first crank pins in constant engagement respectively with said two annular gears.

18. The energy generating system of claim 17, wherein said Stirling engine comprises four of said pistons and four of said piston rods arranged as two opposed pairs, and said second crank arrangement comprises two of said second cranks and two of said second crank pins arranged 180° rotationally offset from each other, wherein said piston rods of a respective one of said two opposed pairs are connected to a respective one of said two second crank pins.

* * * * *